Figure 7:
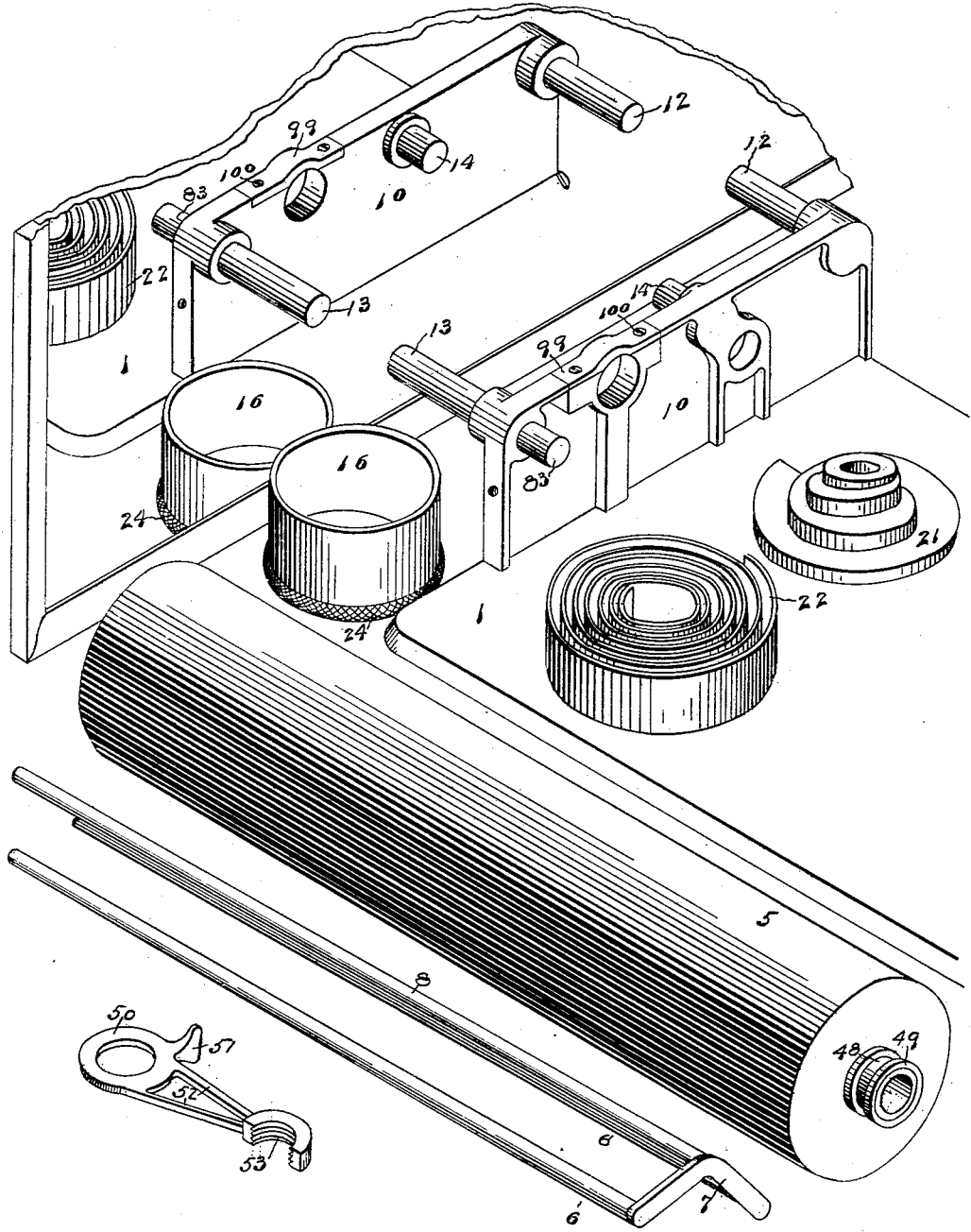

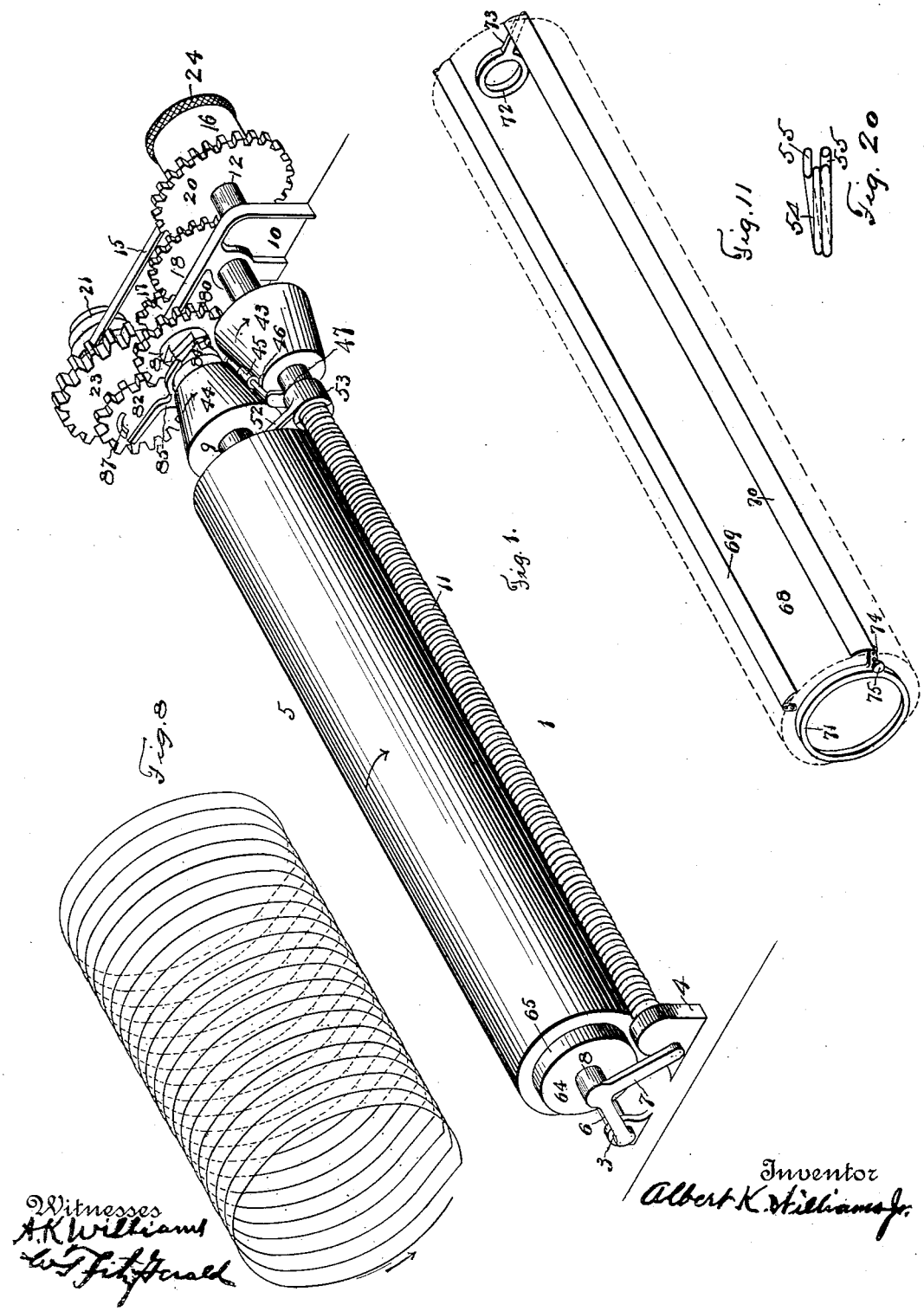

No. 743,366. PATENTED NOV. 3, 1903.
A. K. WILLIAMS, Jr.
CARRIAGE FOR TYPE WRITING MACHINES.
APPLICATION FILED JUNE 19, 1900.
NO MODEL. 8 SHEETS—SHEET 2.
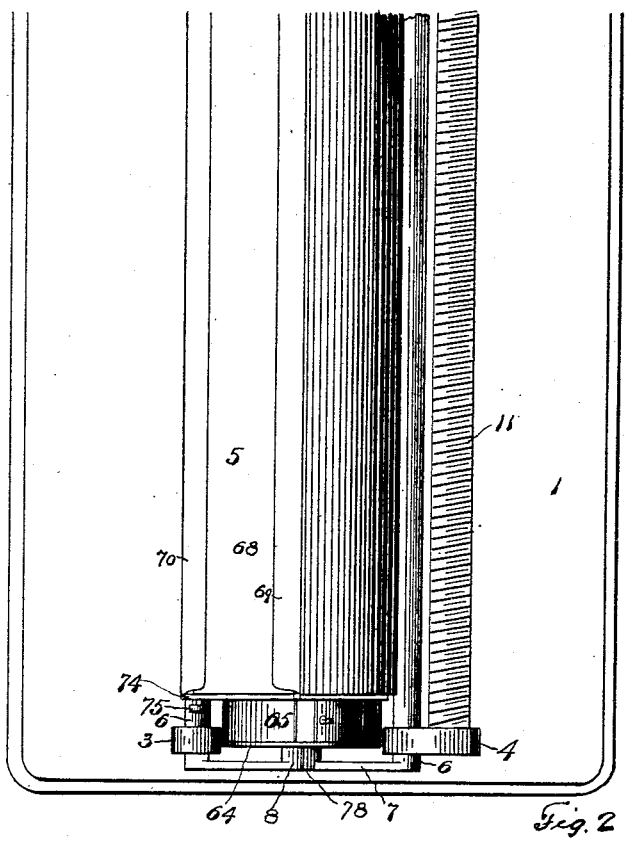
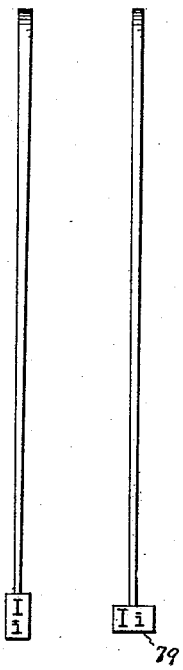
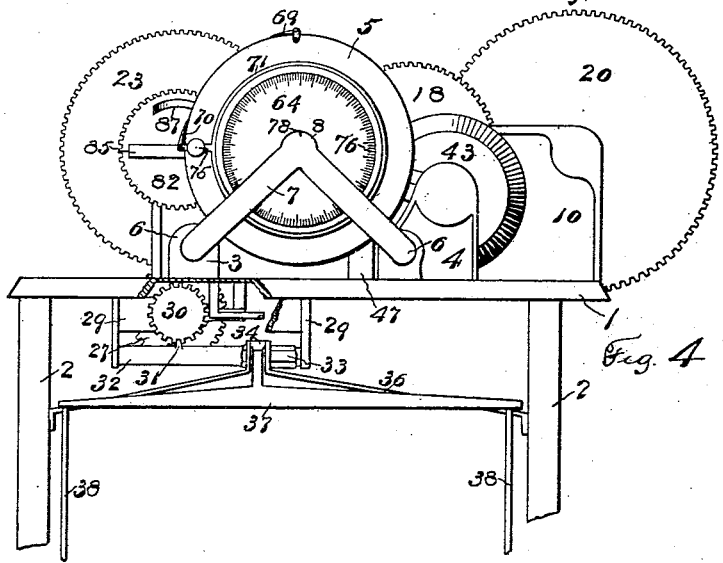

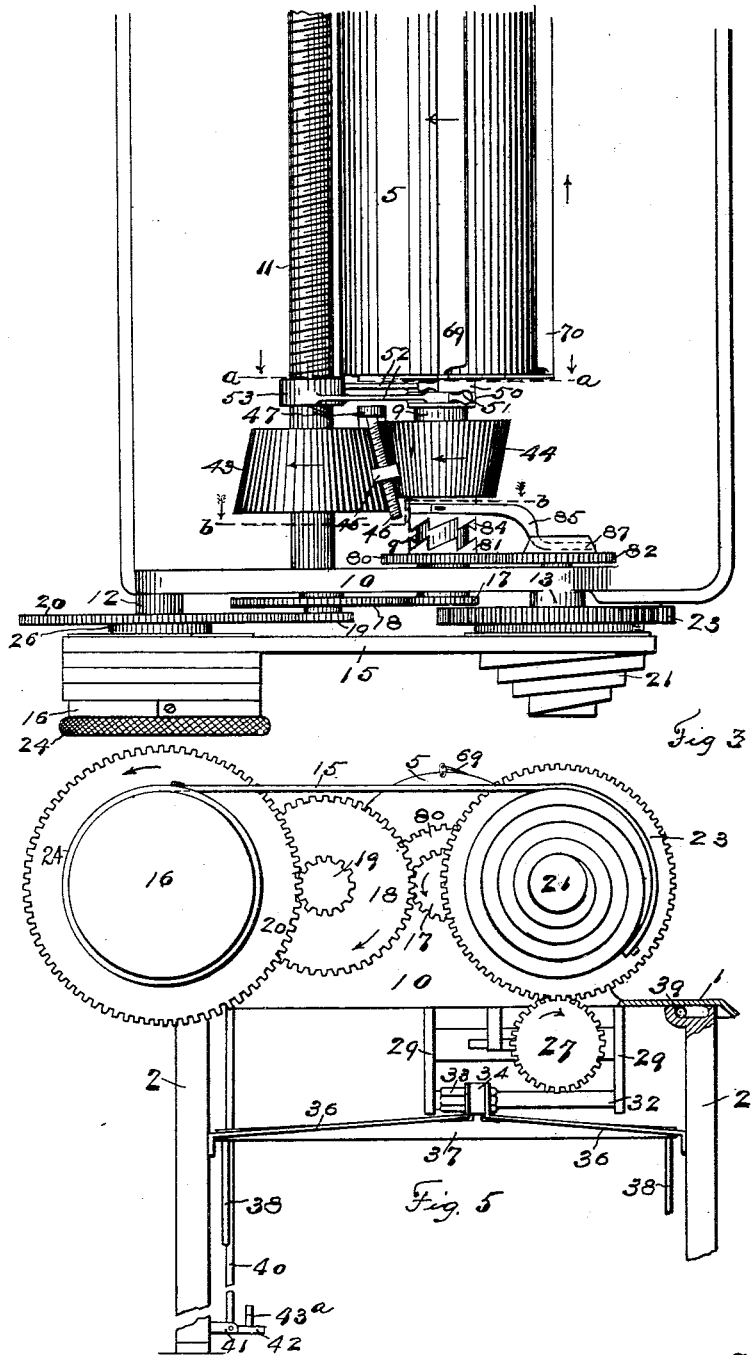

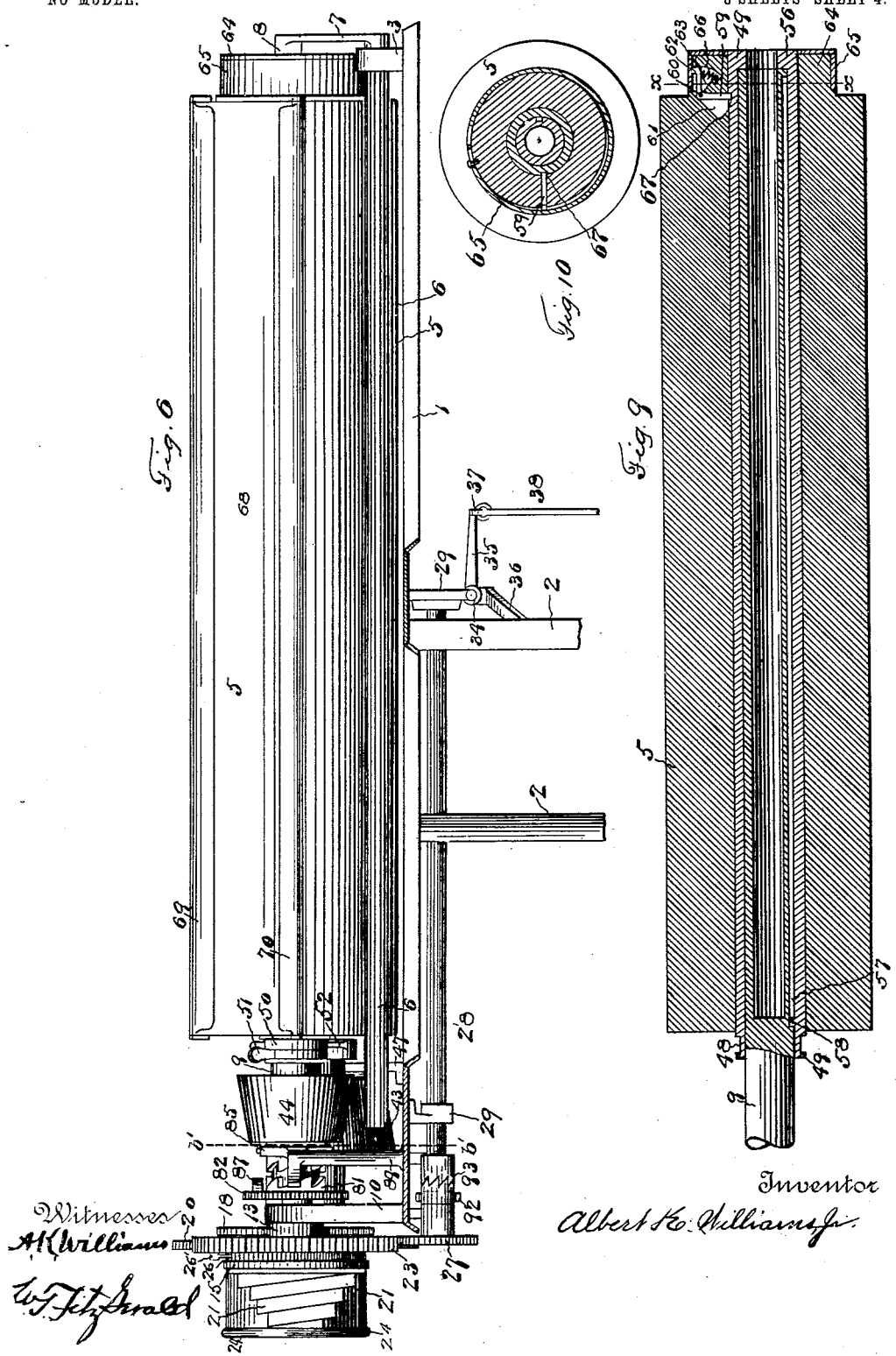

No. 743,366. PATENTED NOV. 3, 1903.
A. K. WILLIAMS, JR.
CARRIAGE FOR TYPE WRITING MACHINES.
APPLICATION FILED JUNE 19, 1900.
NO MODEL. 8 SHEETS—SHEET 6.
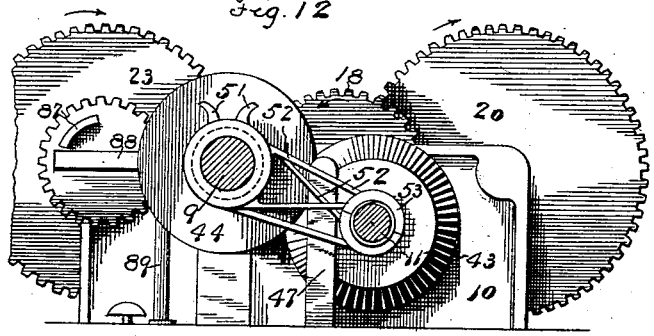
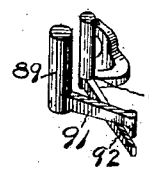
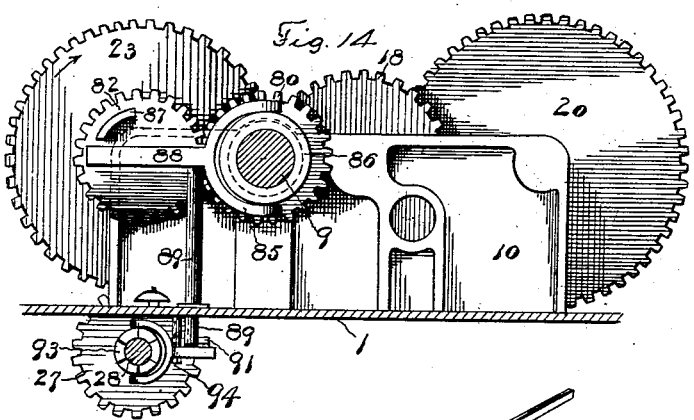
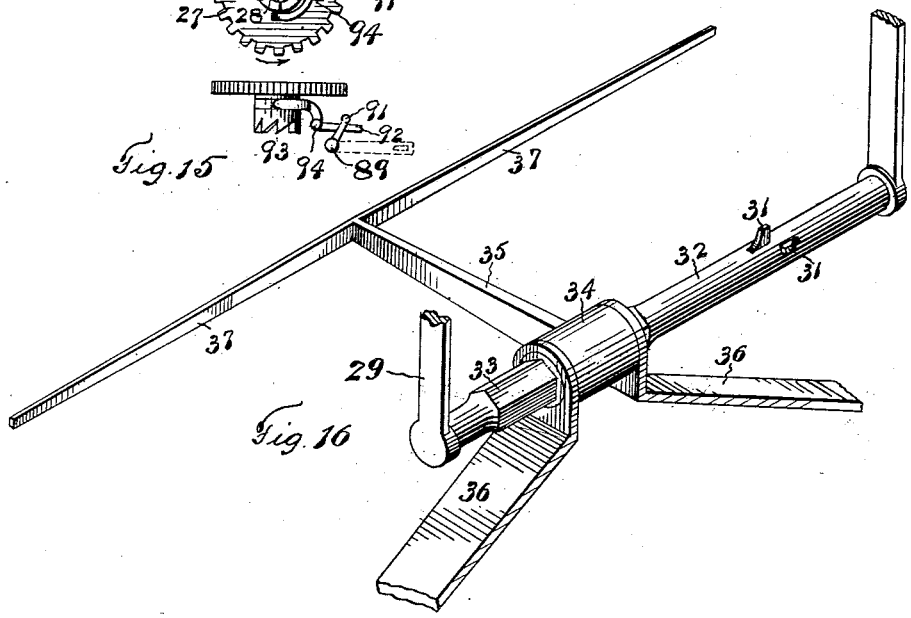
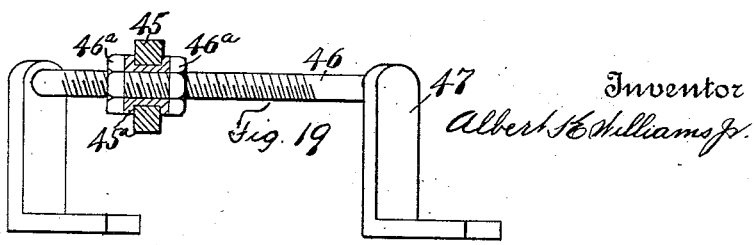
Witnesses
Inventor
Albert K. Williams Jr.

No. 743,366. PATENTED NOV. 3, 1903.
A. K. WILLIAMS, Jr.
CARRIAGE FOR TYPE WRITING MACHINES.
APPLICATION FILED JUNE 19, 1900.
NO MODEL. 8 SHEETS—SHEET 7.
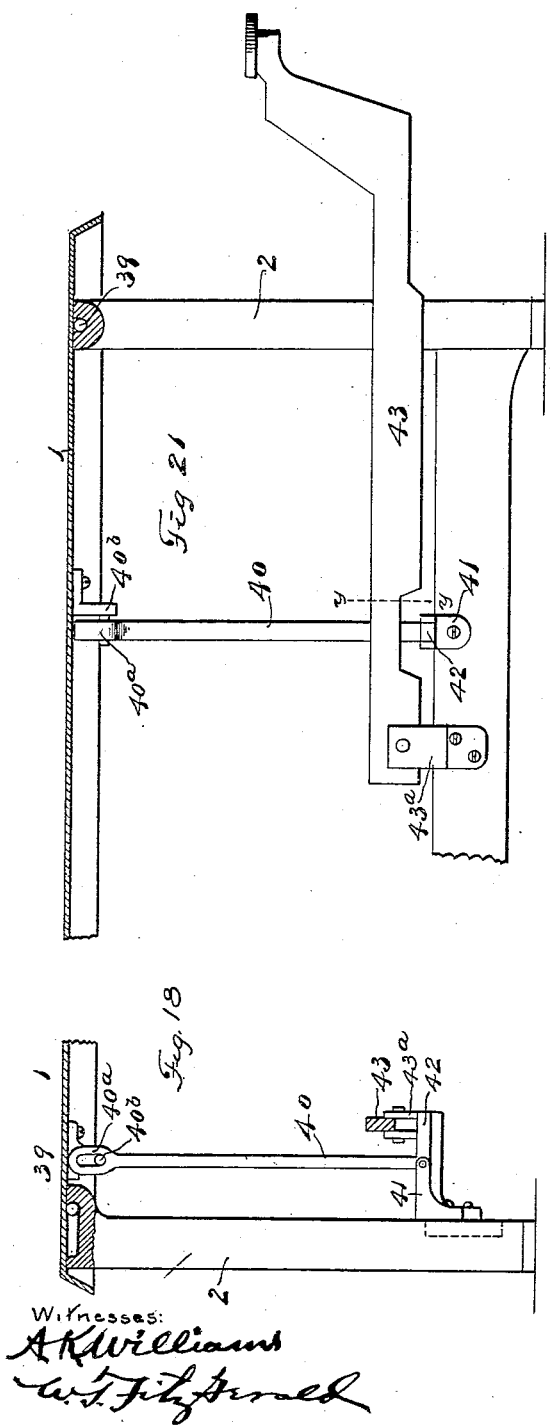
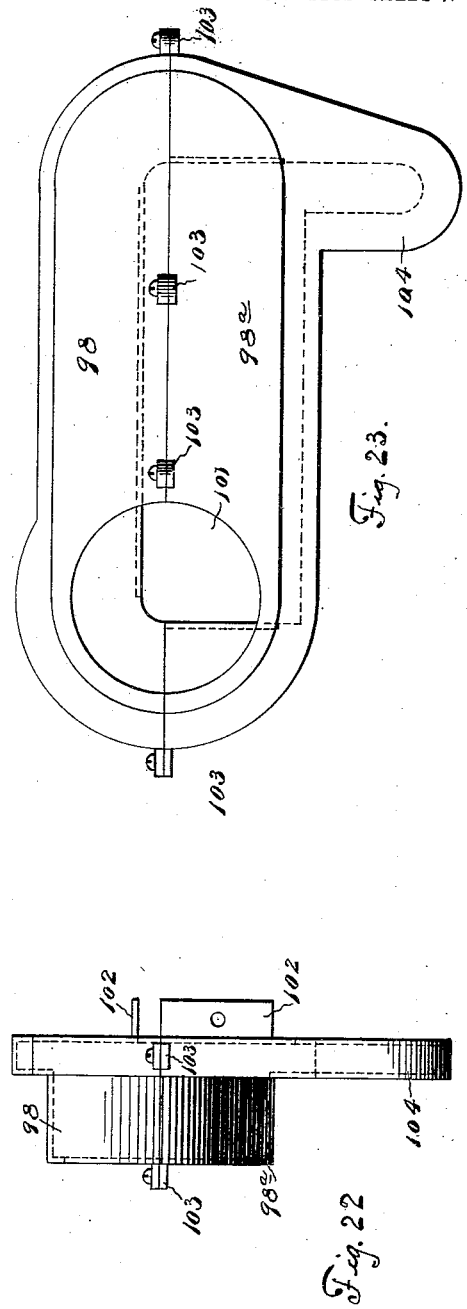
Witnesses:
A. K. Williams
W. J. Fitzgerald
Inventor,
Albert K. Williams, Jr.

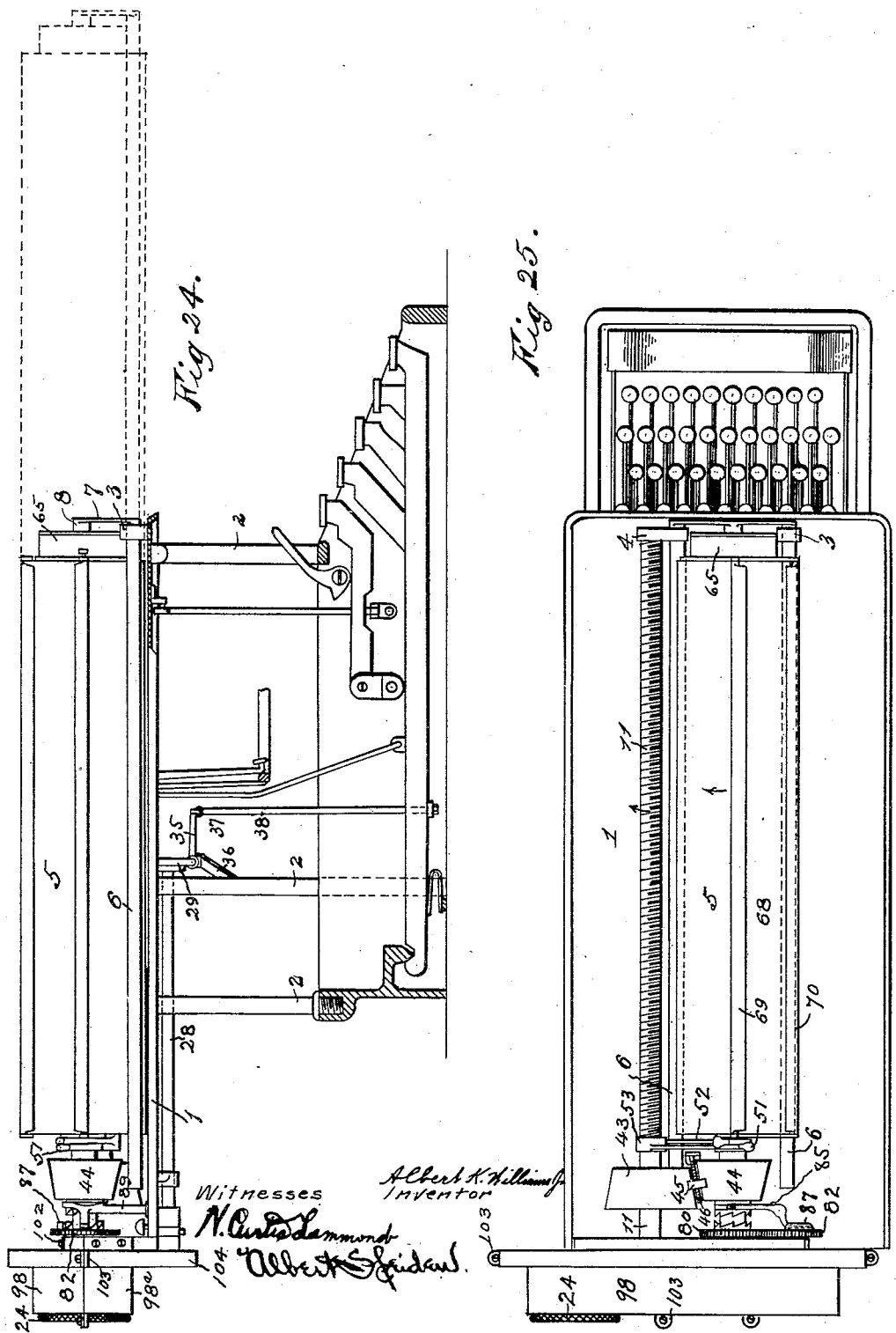

No. 743,366. Patented November 3, 1903.

UNITED STATES PATENT OFFICE.

ALBERT KEITH WILLIAMS, JR., OF WASHINGTON, DISTRICT OF COLUMBIA, ASSIGNOR OF ONE-HALF TO HENRY W. BLAIR, OF MANCHESTER, NEW HAMPSHIRE.

CARRIAGE FOR TYPE-WRITING MACHINES.

SPECIFICATION forming part of Letters Patent No. 743,366, dated November 3, 1903.

Application filed June 19, 1900. Serial No. 20,839. (No model.)

*To all whom it may concern:*

Be it known that I, ALBERT KEITH WILLIAMS, Jr., a citizen of the United States, residing at Washington, in the District of Columbia, have invented certain new and useful Improvements in Carriages for Type-Writing Machines, of which the following is a specification, reference being had therein to the accompanying drawings.

My invention has relation to improvements in type-writing machines of that type or class wherein the paper to be written upon is held in contact with a rotating platen movable also longitudinally to effect the line-spaces on the paper.

The objects of the invention are, first, to provide a type-writing machine of the kind named which prints a line of characters directly at right angles to the axis of the platen and which at the termination of any line will space regularly to the next line and turn the platen to such position automatically as to properly commence the next line; second, to provide improved means for shifting the platen in its relation to the types to make upper or lower case impressions of the types; third, to provide improved means for effecting and adjusting the space between the lines of a page; fourth, to provide improved means for operating the carriage; fifth, to provide a rotating support for the platen which has telescopic movement and rotating movement therewith or independent rotation thereupon when it is necessary to examine the work before removal from the platen; sixth, to provide improved means for placing or confining the paper about the platen; seventh, to provide new means for determining and regulating the distance of writing-surface, and, eighth, to provide an improved form and arrangement of the type-head, as shown in Fig. 17 of the drawings.

The invention involves all these objects, and the novelty embraced in the means I have designed will be hereinafter fully specified, and then particularly pointed out in the claims.

I attain the objects sought by the mechanism illustrated in the accompanying drawings, to be taken as a part hereof, and wherein—

Figure 1 is an assembly in perspective of the rotative and longitudinally-movable platen suitably mounted and journaled on the top plate of the machine-frame and showing the mechanism for actuating the platen. Fig. 2 is a top plan view of the forward end of the carriage, the paper-clamps, the platen-release mechanism or handhold, the telescopic support, and the line-spacer screw being shown. Fig. 3 is a top plan view of the rear end of the carriage, the paper-clamping device, the means of disengaging the platen from the line-spacer screw, the variable-speed cones and the mechanism for operating the same, and the source of power being shown. Fig. 4 is a front elevation of Figs. 2 and 3 and also shows a front view of the power-escapement mechanism and the circular scale especially designed for this machine. Fig. 5 is a rear elevation of Figs. 2, 3, and 4 and also shows a detail of the ball-bearings which support the top plate and provide a means of shifting from upper to lower case types. Fig. 6 is a side view looking at the right-hand side of Fig. 5 and shows the source of power, the variable-speed cones and means of operating same, the means of disengaging the platen from the line-spacer screw, the clamping device, the platen-release mechanism or handhold, the telescopic support, and the power-escapement mechanism in side elevation. Fig. 7 is a perspective view of certain parts of the machine disassembled and shows them as if they were reflected in a looking-glass with the evident object of giving a comprehensive view of both sides of the top plate of the machine, the upright portion showing the stub-shafts which support the source of power. The spring, spring-box and fusee, the platen, and the screw connection are also shown. Fig. 8 is a perspective diagrammatic view showing the course of the platen over a given point—that is, the point of striking of the types against the platen. Fig. 9 is a central longitudinal section cut lengthwise of the platen, showing the inner metallic sleeve, the shaft upon which and by which the platen is rotated and the recess therein which receives the telescopic support, and the telescopic support and the handhold in detail. Fig. 10 is a transverse section of Fig. 9, taken on the line $xx$. Fig. 11 is a detail in perspective of the paper-clamping device. Fig. 12 is a sectional view on the line $a\ a$, Fig. 3, showing in detail the means of disengaging the platen from the line-spacer screw looking toward the rear of the machine. Fig. 13 is a perspective view of the lower clutch. Fig. 14 is a sectional view on the irregular line $b\ b$, Fig. 3, looking in the direction of the arrow and showing in detail the clutch mechanism and means of operating same. This view is also cut substantially on the line $b'\ b'$, Fig. 6. Fig. 15 is a detail bottom plan view of the clutch mechanism. Fig. 16 is an enlarged detail of the means devised to allow sliding action in the power-escapement mechanism when the top plate is shifted to print upper or lower case characters. Fig. 17 is an improved form and arrangement of the type-head. Fig. 18 is a detail view of the shift mechanism. Fig. 19 is a detail view of the friction-roller used with the speed-cones. Fig. 20 is a detail view of spring 54. Fig. 21 is a side elevation of Fig. 18. Figs. 22, 23 illustrate the dust-proof covering provided for the operative mechanism; and Figs. 24 and 25 show, respectively, a side and a plan view of the machine.

The numeral 1 designates the top plate of the machine supported to slide on suitable standards 2, placed at the corners of the plate 1 and seen in Figs. 4, 5, and 6 of the drawings.

On the top plate 1, at the front end thereof, are formed or suitably secured vertical bearing-lugs 3 and 4, formed with apertures therethrough arranged parallel with the axis of the platen 5, and therein are slidingly disposed the platen-carrying arms 6 6, united at their front ends by the cross-bar 7, which is inclined upward from the ends toward the center, as shown in Figs. 1, 2, 4, 6, and 7, where it is suitably secured to the end of the telescopic portion 8 of the platen-shaft 9.

At the rear of the top plate 1 is suitably mounted and secured a vertically-arranged plate 10, in which are formed bearings for the screw-threaded shaft 11 and the platen-shaft 9 and formed with stub-shafts 12 13 14, which support the combination of cogs used with the fusee 21, band or chain 15, and box 16. This combination is as follows: Mounted upon the rear end of the platen-shaft 9 is a small cog-wheel 17, which meshes with the cog-wheel 18. Secured to the face of the cog-wheel 18 is another small cog-wheel 19, which meshes with the larger gear-wheel 20, and secured to the cog-wheel 20 is the spring-box 16, as shown in Figs. 3 and 5, which contains the spring 22 source of power. These parts 16, 20, and 22 are mounted on the stub-shaft 12. Around the box 16 may be seen in Figs. 3 and 5 the band or chain 15, which will be described later.

Preferably to the extreme left of the support 10 and on its rear side is the stub-shaft 13, which carries the cog-wheel 23 and the spirally-formed device 21, which makes the pull of the spring 22 constantly equal. This "fusee" 21, as it is called, is so formed as to have a constantly-varying radius. Thus when the spring 22 has the greatest tension the leverage is smallest, and as the strength gradually decreases the leverage gradually increases. Around the periphery of this fusee the chain or band 15 winds as it unwinds from the box 16. The outer portion 24 of the spring-box 16 may be milled to serve as a handhold for the purpose of rewinding the spring 22 when it is run down. On the spring-box 16, where it contacts with the cog-wheel 20, are shown ratchet-teeth 26, which are engaged by the pawl 26', carried by the cog-wheel 20. After the spring 22 is wound up the chain 15 is around the box 16, (as shown in Figs. 3 and 5 it is nearly run down,) and there must be sliding movement between the fusee 21 and the cog 23, as well as between the spring-box 16 and the cog 20 (of the compound train of cogs which act to operate the platen) to allow winding when the spring runs down. When it is intended to wind the spring up, the pawl 26' engages teeth 26 successively and retains the spring in tensive position until gradually released in the process of doing the work required.

The cog-wheel 23 meshes with a smaller gear-wheel 27, which is mounted on a shaft 28 under the top plate 1. At the forward end of this shaft 28 is seen the escapement mechanism of the following-described parts: The shaft 28 is supported in hangers 29, distributed along its length and suitably secured or cast to the under side of the plate 1. At its forward end may be seen the escapement-wheel 30, which performs the function of releasing a sufficient distance to make room for the next character to be printed on the platen by the action of the two dogs 31, which are a part of the shaft 32. At 33 this shaft assumes a polygonal form, because when the machine shifts to print capitals there must be sliding contact between the parts which are fastened to the top plate 1 and those attached to the supports 2, which form the framework of the machine. Around the shaft 32 at 34 is a casing which has a horizontal arm 35 attached thereto, and this casing is journaled in horizontal supporting-brackets 36, which allow free rotary movement, but confine the casing 34 against a sidewise movement. The shaft 32 is adapted to slide within the casing 34, as may be readily seen by the drawings, Figs. 4, 5, and 16.

The arm 35 is connected to or formed a part of the cross-arm 37, (shown in Figs. 4, 5, 6, and 16,) which extends across the entire width of the keyboard and is attached by depending arms or wires 38 to a similar bar under the key-levers. A depression of any of these key-levers would necessarily give an escapement of the platen 5. The key and space levers, through the parts 38 37 and escapement 31 30, allow a step-by-step rotation of shaft 28, which latter is under stress from the spring 22 through the parts 15, 21, 23, and 27. The spring also gives a rotation, which is step by step or letter by letter by reason of the above escapement, to the platen through the parts 16 26 26ᵃ 20 19 18 17 9.

At 39 may be seen the ball-bearings upon which the top plate 1 moves while shifting. This shift is effected by means of the arm 40 of the bell-crank lever, fulcrumed at 41 and extending under the keyboard at 42. The upper end 40ᵃ of the arm 40 is made with an elongated slot or eye, in which may be seen the pin 40ᵇ, suitably secured to the plate 1, as shown. The bracket 43ᵃ is provided as supporting means for the shift-key 43. A depression of the shift-key 43ᵇ, fulcrumed on bracket 43ᵃ, would cause the top plate 1 to shift, as may be readily seen by examination of Figs. 5 and 18.

The line-regulator device is the means I show to give the distance between the lines on the sheet of paper. Preferably to the right of the platen 5 is the screw-threaded shaft 11, upon the revolutions of which depends the distance between the lines on the paper. It is mounted in bearings in the vertically-arranged plate 10 and lug 4 and has fixed near its rear end a cone 43, which is caused to revolve when the larger cone 44, mounted to slide and turn loosely on the shaft 9, is brought into contact with the small friction-roller 45, supported on the screw-threaded shaft 46, which is screwed forward and backward from the standard 47 to vary the relative speeds of the two cones. The standard 47 is suitably secured to the top plate 1. As shown in Fig. 19, the part 47 may be shown in duplicate to sustain both ends of the screw-threaded shaft 46. It may be well here to describe more fully in detail the construction of the friction-roller 45. It is mounted in a bearing 45ᵃ, which remains fixed when placed in a desired position, and the nuts 46ᵃ are screwed against both of its outer faces. It is evident that the roller by this means may revolve freely. Mounted in a recess 48 on the end of the inner metallic sleeve 49 of the platen 5 which protrudes beyond the same are two bands 50 with thumb-pieces 51 and arms 52, which hold the screw connection 53. This screw connection is cut on a line of its center in halves and one of the arms 52 formed to each half. By pressing the thumb-pieces 51 inward the screw connection 53 is caused to disengage the screw-threaded shaft 11 for the purpose of moving the platen 5 forward or backward along the length of its travel, and the screw connection 52 is held normally in engagement with the screw-threaded shaft 11 by a spring 54. The hooks 55 on the spring 54 are placed back of the thumb-pieces 51, while the spring is around the bands 50 between them.

Incasing the shaft 9 is a metallic sleeve 49, which is somewhat longer than the platen 5 and is releasably secured thereto. At the outer end 56 this sleeve is made smaller in internal diameter for the purpose of fitting the telescopic journal 8 of the shaft 9 when the platen is at the end of its travel. In the shaft 9 is a slot 57, cut the length of the travel of the platen 5, and fitted therein is a key 58, formed to the sleeve 49, which causes the platen to revolve simultaneously with the shaft 9, while it still has a lengthwise movement to allow for the lines on the paper.

In order that the work may be examined with readiness and corrections made as may be desired or necessary, the platen may be revolved independently of the operating mechanism and then returned to original position, and to consummate this I have devised the following-described mechanism: Referring to Figs. 9 and 10, the numeral 59 designates a bell-crank lever fulcrumed at 60, with one arm 59 resting in a recess 61 and the other arm 62 lying in a recess 63 in the handhold 64 of the platen, with its end resting normally against the spring-band 65 and so held by the expanding spiral spring 66, while the other arm 59 of the bell-crank lever engages a slot 67, cut in the periphery of the metallic sleeve 49 of the platen and holds it in normal position against turning. It will thus be seen that when pressure is applied to the spring-band 65, which forms part of the handhold 64 of the platen, by the thumb and fingers of the writer the arm 62 of the bell-crank lever in contact therewith is moved inward and the other arm 59 moves backward in the recesses 61, and the platen then can be freely rotated.

In Fig. 11 is illustrated my construction of paper-clamping clips or bars designed for use on any width of paper less than the circumference of the platen. The surface indicated by 68 in the figure is that upon which the impressions are made and is that portion between the clamping edges of the clamps. One of the clamps, 69, is rigidly fixed to the platen, while the other, 70, is secured in movable position by means of the bands 71 and 72 and arms 73 74. The arm 74 is provided with a set-screw 75, which bears against the end of the platen 5 and holds it in any desired position.

The scale 76 (see Fig. 4) is of circular design and graduated to suit spaces required by each succeeding character printed on the paper. Centrally cut in the top of the crossbar 7 is a line 78, and the graduation of the scale vertically above the said line 78 is evidently the point directly over where the last impression is made. The scale is set at nothing, the starting-point being the graduation corresponding with the inner edge of the rigidly-fixed clamp 69.

The platen, it will be perceived, is rotated in a true circle (see Fig. 8) for the entire line and not, as usual in machines of this style, in the line of a helix or spiral with a given pitch between the lines, the distance between the lines in my invention being also changeable. The only pitch made in this machine is that taking place in the interval during which the platen is moved between the two back edges of the paper-clamps 69 70 in passing from the point where the types strike and make the impression on the paper and when the cam 87 simultaneously therewith actuates the escapement mechanism.

In Fig. 17 of the drawings I have illustrated the old form or arrangement of types, and that form I have devised as particularly adapted to the present invention, the illustration to the left being the old arrangement and that to the right being that adapted to the present machine. It will be perceived that in disposing the platen at right angles to those moved parallel with the keyboard it becomes essential to change the relative position of the platen 5 to the types and arrange the types to strike the platen at right angles to the line of longitudinal movement. Hence I fix the types on the type-bars so that they will at all times strike at a point in successive alinement with the line being written. This disposition of the types is, as stated, illustrated in the right-hand illustration of Fig. 17. The type-heads 79 of course change position in the series in their relation to the type-bars to which attached; but they uniformly assume such position as to be in successive alinement with the line being printed.

I have told you that the larger cone 44 being brought into contact with the small friction-roller 45 the cone 43 on the shaft 11 is caused to revolve; but I have neglected to describe the means I employ to accomplish this end. By examination of Figs. 3, 6, and 14 you will see rigidly mounted upon the shaft 9 a cog-wheel 80, which has formed to its hub the half side of a clutch 81 and which meshes with a similar cog-wheel 82, mounted upon the stub-shaft 83. (Shown in Fig. 7.) Fixed to the hub of the cone 44 is the other half 84 of the clutch 81, which is brought into contacting relationship to actuate the line-spacer mechanism by means of the Y-shaped arm 85, which couples to the collar or band 86, seated in the part 84 of the clutch. On the cog-wheel 82 is mounted or fixed the cam 87, and the part 88 of the Y-shaped arm 85 is so constructed that the cam 87 will engage the end of the said arm and press it outward, and as it swings upon the fulcrum or supporting-shaft 89, which is rigid with the parts 85 and 88 and is shown in Figs. 6, 12, and 14, the clutch end of the Y-shaped arm 85 will bring the counterpart pieces 81 and 84 of the clutch into engagement for the period of time the cam 87 operates, which is long enough to shift the platen. By observation of Figs. 6, 13, 14, and 15 it will be seen that the shaft 89 after forming a shoulder extends below the top plate 1 and has secured to its lower end the arm 91, which acts against the arm 92 of the smaller clutch 93, fulcrumed at 94 and by the action of the cam 87 operates a clutch. (Seen at 93.) This clutch acts oppositely to the clutch 81, so that when the clutch 81 is out of engagement the lower one, 93, is placed in operative position and enables the release mechanism to retain the power from escaping too speedily. It will be observed that the cog-wheel 23 is twice the width of its smaller pinion 27 and that the clutching and unclutching at 93 operates to slide the wheel 27 back and forth, but never far enough to disengage it from wheel 23. When, however, the cam 87 operates to reverse the positions of these clutches, the clutch 81 is placed in operative position, while the other one, 93, (normally serving as a part of the means for connecting the shaft 28 with the main spring-power mechanism at 22,) is disengaged, and the effect is that the power being released at 93 the mechanism has a sudden increase of speed, and the distance between the lines is made at a higher rate of speed than while the machine is being operated through the escapement.

A dust-proof metallic cover 98 protects the exposed parts and is secured to the top of the support 10. The milled end 24 of the spring-box 16 is necessarily left exposed through the opening 101. The projections 102 form means of securing the box or cover 98 to the support 10. This box or casing 98 is divided on a line through the centers of the parts which it protects and secured together by the screws 100 at the several points 103. The part 98ª at 104 is made with a depending pocket, which incloses the cog 28.

Fig. 7 at 99 shows how it is proposed to provide means of removably placing the platen-shaft 9 in its journal-bearings. Screws 100 secure the parts together. One of these screws may be employed to hold the metallic cover 98 in place.

I do not wish to limit myself to the specific construction herein shown and described.

Having thus fully described the several parts of my invention, the operation is as follows: The sheet of paper having been caught under the fixed clamp 69, the spring-band 65 of the handhold 64 of the platen is then compressed until the crank-arm 59 is lifted from the slot 67, cut in the periphery of the metallic sleeve 49 of the platen, and then the platen 5 is revolved, while the paper is held taut until the other clamp 70 comes into such position that the paper may be confined under its edge, and thus held. If the machine is set to space the desired distance between the lines by means of the adjustment on the shaft 46 of the confining-nuts 46ª of the journal-sleeve 45ª of the friction-roller 45, Fig. 19, you may now begin to write. Every depression of the keys gives an escapement of the power until one line has been completed, when the bell 95 indicates a stop, the line-regulator device is actuated, and the next line is spaced off on the paper.

It is obvious that the spring 22 herein shown is sufficient to illustrate a source of power; but I do not wish to be understood as considering myself limited to it specifically, and where it may be deemed desirable there may substituted for the spring any of the various sources of power—such as, for instance, electricity or compressed air.

What I claim is—

1. In a type-writer, the combination, with impression devices, of a movable paper-holding platen, and an adjustable platen-moving mechanism whereby, at the end of a line, the platen may be caused to be automatically moved longitudinally for a greater or less distance to the next line, according to the adjustment of said mechanism.

2. In a type-writer, the combination with impression devices, of a rotary paper-holding platen, a rotary screw-threaded shaft parallel with the same and connected with the platen to move the latter longitudinally, connections between said platen and shaft whereby the latter is rotated, and means for adjusting said connections to vary the distance of rotation of said shaft, substantially as set forth.

3. In a type-writer, the combination, with impression devices, of a rotary paper-holding platen, means for turning the same to effect a spacing from letter to letter, and mechanism comprising the screw-shaft 11 and intermittent connections between said shaft and the platen whereby the said rotary motion effects a longitudinal movement of the platen at the end of a line, substantially as set forth.

4. In a type-writer, the combination, with impression devices, of a movable paper-holding platen, and an adjustable platen-moving mechanism comprising a screw-shaft and a detachable clutch connecting the platen with the same whereby, at the end of a line, the platen may be caused to be automatically moved for a greater or less distance to the next line, according to the adjustment of said mechanism.

5. In a type-writer, the combination, with impression devices, of a rotary paper-holding platen, a rotary screw-threaded shaft, parallel with the same and connected with the platen to move the latter longitudinally, a variable-speed gearing between said platen and shaft whereby the latter is rotated, and means for adjusting said gearing to vary the distance of rotation of said shaft, substantially as set forth.

6. In a type-writer the combination of a rotary and longitudinally-movable cylinder-platen, paper-holding devices thereon, impression devices, a platen-rotating motor, mechanism for moving the platen longitudinally, and means operated by the turning of the platen for connecting the motor with said platen-moving mechanism.

7. In a type-writer the combination of a rotary and longitudinally-movable platen-cylinder, a motor for turning the same, impression devices controlling said motor, mechanism for moving the platen longitudinally, and a cam, projection or shoulder turning with said platen and acting to cause the connection of the motor with said platen-moving mechanism.

8. In a type-writer the combination of a rotary and longitudinally-movable platen-cylinder, a screw-shaft, a connection between the same whereby the turning of the shaft moves the platen longitudinally, a motor for turning the cylinder, and means operated by or with the turning of the platen for connecting the shaft with the motor at the time between the end of one line and the beginning of the next.

9. In a type-writer the combination of a rotary and longitudinally-movable platen-cylinder, a parallel screw-shaft, a detachable clutch connecting the same, a variable-speed gearing connected with the shaft, a motor, such as a spring, for turning the platen, and a clutch operated by the turning of the platen for connecting said gearing with the motor.

10. The combination with the platen-cylinder and screw-shaft, of the cones 44, 43, the adjustable connecting-wheel 45, means for turning the platen, a clutch operated by or with the rotation of the platen, for connecting the cone 44 with said turning means, and a connection between the platen and the shaft whereby the rotation of the latter moves the platen longitudinally.

11. In a type-writer, the combination of a rotary and longitudinally-movable platen-cylinder, a screw-shaft, means operated by or with the turning of the platen for connecting the shaft with the motor at the time between the end of one line and the beginning of the next, and the separable nut 53 on the shaft and connected with the platen for moving the latter longitudinally.

12. In a type-writer the combination with a longitudinally-movable platen-cylinder, of a parallel screw-shaft, means for turning said shaft, a nut formed of separable parts adapted to engage said shaft, each of which parts is pivotally connected with the platen, and means for normally holding said parts in engagement with the shaft.

13. In a type-writer the combination of a base-frame having recesses, balls 39 therein, the top plate 1, a cylinder-platen on said plate, and a spring-motor for actuating the platen also carried on said plate, impression devices, and means for moving said plate relative to the latter.

14. In a type-writer, the combination, with the movable cylinder-platen, and movable plate carrying the same, of a spring-motor for turning the platen carried on said plate, an escapement controlling said motor and having a shaft lying crosswise of the platen, impression devices, and mechanism in which said shaft is longitudinally movable connecting the latter with the impression devices.

15. In a type-writer the combination with the platen-cylinder having a central bearing, of the support or carriage for the same consisting of the journal-rod 8 and connected sliding rods 6, and a platen-rotating shaft held from longitudinal movement and having a bearing on said rod 8.

16. In a type-writer the combination of a platen-cylinder and a central shaft engaging the platen to rotate the same, the platen being longitudinally movable on said shaft, means for moving the platen longitudinally, and an intermittent connection between said platen-moving means and said shaft.

17. In a type-writer the combination of the cylinder-platen, the shaft 9, the interposed sleeve 49 having a sliding connection with said shaft and on which the platen is rotary, and a latch by which the platen is normally and detachably connected with the sleeve.

18. The combination with a platen-roller, of the elastic handhold 64, a support for the roller and the latch 56 engaging said support to hold the roller from turning relative to said support and releasable by said handhold.

19. In a type-writer the combination of a platen-cylinder, means for feeding the same relative to the impression devices, a paper-holding bar connected with the outer portion of the cylinder, a second paper-holding device relative to which the outer portion of the cylinder is revoluble, and means for disconnecting the outer portion of the cylinder from said feeding means and turning the same freely.

20. The combination of the platen, the screw 11 and a telescoping shaft having a portion within the platen, a parallel outer portion rigid therewith, and means for guiding the latter parallel with said screw.

In testimony whereof I affix my signature in presence of two witnesses.

ALBERT KEITH WILLIAMS, JR.

Witnesses:
N. CURTIS LAMMOND,
A. K. WILLIAMS.